(12) United States Patent
Kim et al.

(10) Patent No.: US 7,212,264 B2
(45) Date of Patent: May 1, 2007

(54) LIQUID CRYSTAL DISPLAY DEVICE COMPRISING A BLACK MATRIX HAVING A FIRST SLOPED SIDE LESS STEEP THAN A SECOND SLOPED SIDE

(75) Inventors: Woong-Kwon Kim, Gyeonggi-do (KR); Seung-Ryull Park, Gyeonggi-do (KR)

(73) Assignee: LG.Philips LCD Co., Ltd, Youngdungapo-ku, Seoul (KR)

( * ) Notice: Subject to any disclaimer, the term of this patent is extended or adjusted under 35 U.S.C. 154(b) by 182 days.

(21) Appl. No.: 10/989,417

(22) Filed: Nov. 17, 2004

(65) Prior Publication Data
US 2005/0117094 A1    Jun. 2, 2005

(30) Foreign Application Priority Data
Dec. 1, 2003    (KR) .................... 10-2003-0086362

(51) Int. Cl.
*G02F 1/1333*    (2006.01)

(52) U.S. Cl. ..................... 349/110; 349/106; 349/123

(58) Field of Classification Search ................ 349/110, 349/106, 123
See application file for complete search history.

(56) References Cited

U.S. PATENT DOCUMENTS 6,183,917 B1 *  2/2001  Sakamoto et al. ............. 430/7
6,417,899 B1 *  7/2002  Jones et al. .................... 349/96

* cited by examiner

*Primary Examiner*—Thoi V. Duong
(74) *Attorney, Agent, or Firm*—McKenna Long & Aldridge LLP

(57) ABSTRACT

A liquid crystal display device include: a first substrate and a second substrate facing each other, the first and second substrate including pixel regions; a first alignment layer on the first substrate; a black matrix on the second substrate; a first sloped side of the black matrix that is less steep than a second sloped side of the black matrix; a color filter layer on the black matrix; a second alignment layer on the color filter layer; a liquid crystal material interposed between the first and second alignment layers; and a rubbing direction of the second alignment layer corresponding to a first direction from the first sloped side to the second sloped side.

14 Claims, 17 Drawing Sheets

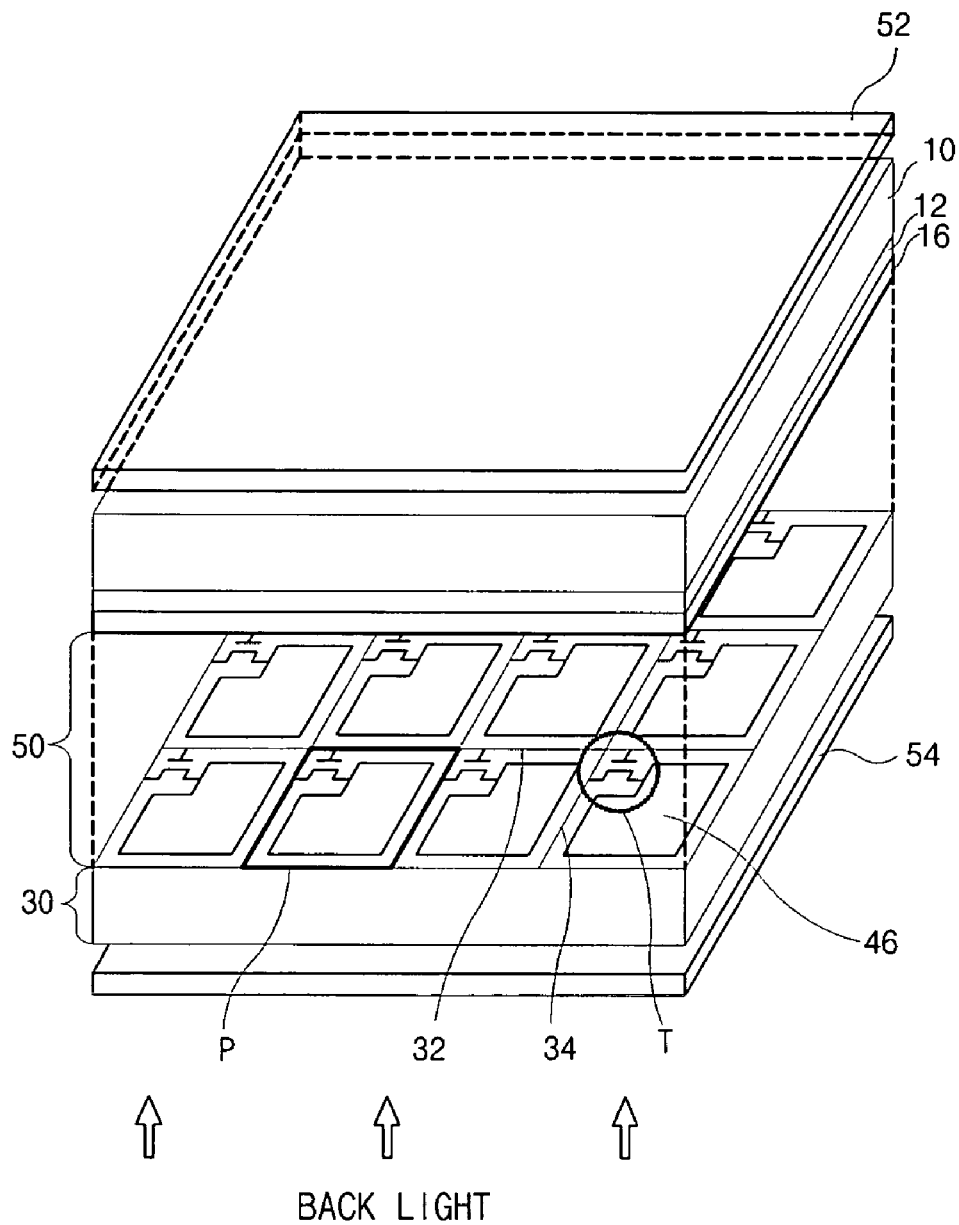
FIG. 1 (R/S)
(related art)

LIQUID CRYSTAL DISPLAY DEVICE COMPRISING A BLACK MATRIX HAVING A FIRST SLOPED SIDE LESS STEEP THAN A SECOND SLOPED SIDE

This application claims the benefit of Korean Patent Application No. 2003-86362, filed on Dec. 01, 2003, which is hereby incorporated by reference.

BACKGROUND OF THE INVENTION

1. Field of the Invention

The present invention relates to a liquid crystal display (LCD) device, and more particularly, to an LCD device and a method of fabricating the LCD device.

2. Description of the Related Art

Presently, LCD devices are being developed as the next generation of display devices because of their light weight, thin profile, and low power consumption. In general, an LCD device is a non-emissive display device that displays images using a refractive index difference utilizing optical anisotropy properties of a liquid crystal material that is interposed between an array (TFT) substrate and a color filter substrate. Among the various type of LCD devices commonly used, active matrix LCD (AM-LCD) devices have been developed because of their high resolution and superiority in displaying moving images. The AM-LCD device includes a thin film transistor (TFT) in each pixel region as a switching device, a pixel electrode in each pixel region, and a second electrode used for a common electrode.

FIG. 1 is a perspective view of an LCD device according to the related art. In FIG. 1, first and second substrates 10 and 30 are arranged to face each other with a liquid crystal material 50 interposed therebetween. On an inner surface of the first substrate 10, a color filter layer 12 and a common electrode 16, which functions as an electrode for applying an electric field to the liquid crystal layer 50, are subsequently formed. The color filter layer 12 includes a color filter for passing only a specific wavelength of light, and a black matrix (not shown) that is disposed at the boundary of the color filter and shields light from a region in which alignment of the liquid crystal material is uncontrollable. On an inner surface of the second substrate 30, a plurality of gate lines 32 and a plurality of data lines 34 are formed in a matrix array defining individual pixel regions P. A TFT T, which functions as a switching device, is disposed in each pixel region P where a gate line 32 and a data line 34 cross. A pixel electrode 46 is connected to the TFT T. Although not shown, the thin film transistor T includes a gate electrode to where a gate voltage is applied, source and drain electrodes for applying a data voltage to the pixel electrode.

First and second polarizing plates 52 and 54, which transmit only light parallel to a polarizing axis, are disposed on outer surfaces of the first and second substrates 10 and 30, respectively. An additional light source, such as a backlight, is disposed under the polarizing plate 54. Although not shown, first and second alignment layers contacting the liquid crystal layer 50 are formed on inner surfaces of the first and second substrates. The surfaces of the first and second alignment layers are aligned along predetermined rubbing directions, respectively.

FIGS. 2A and 2B are schematic views showing a liquid crystal display device according to the related art. FIG. 2A is a plan view and FIG. 2B is a cross-sectional view taken along a line II—II of FIG. 2A.

As shown in FIG. 2A, a plurality of pixel regions P are defined on a substrate 60. A black matrix 64 is formed on the substrate 60 and has a plurality of open portions 62. Each of the open portions 62 corresponds to each of the pixel regions P.

A color filter layer 66 is formed over the substrate 60 having the black matrix 64 and includes red, green and blue sub-color filters 66a, 66b and 66c. The red, green and blue sub-color filters 66a, 66b and 66c are located in the open portions 62. In addition, a common electrode 68 and an alignment layer 70 are sequentially formed over the black matrix 64 and the color filter layer 66 on the substrate 60.

The black matrix 64 is made of one of chromium (Cr)-based materials and resin materials. Typically, the black matrix material is made of resin materials. A black matrix formed by coating a resin material is formed thicker than a black matrix formed by depositing a Cr-based material. Therefore, a large step difference is created by a portion of the color filter layer 66 that overlaps edges of the black matrix 64, as shown in FIG. 2B. When a rubbing direction rl of the substrate 60 is from a right upper portion to a left lower portion in 45 degrees as shown in FIG. 2A (similarly, the rubbing direction is from right to left in the cross sectional view of FIG. 2B), a rubbing defect occurs at a first sloped side SR, as shown in FIG. 2B, that causes light leakage. This light leakage severely degrades a black picture state.

To improve an aperture ratio by reducing an align margin, a structure in which both the thin film transistors and color filters are formed on the same substrate has been suggested. In such a structure, the black matrix has a thicker thickness than the black matrix shown in FIG. 2B in order to effectively block light due to an increased step difference caused by forming a the thin film transistor. Thus, a rubbing defect caused by an even larger step difference becomes more severe. Hereinafter, color filter layer on thin film transistor (COT) type LCD device in which the color filter device is formed on the substrate having the thin film transistor will be explained.

FIGS. 3A and 3B are schematic views showing a COT type LCD device according to the related art. FIG. 3A is a plan view and FIG. 3B is a cross sectional view taken along a line III—III of FIG. 3A.

As shown in FIGS. 3A and 3B, a gate line 72 is formed on a substrate 70 along a first direction, a data line 80 is formed along a second direction orthogonal to the first direction. A thin film transistor T is located adjacent to a crossing of the gate line 72 and the data line 80.

A color filter layer 86 that includes red, green and blue sub-color filters 86a, 86b and 86c is formed over the thin film transistor T, the gate line 72 and the data line 80 on the substrate 70. Each of the red, green and blue sub-color filters 86a, 86b and 86c is located in a pixel region P defined by the gate line 72 and the data line 80. Specifically, each of the red, green and blue sub-color filters 86a, 86b and 86c overlaps portions of the gate and data lines 72 and 80. A black matrix 88 is formed over the thin film transistor T as an island pattern. An insulating layer (not shown) is formed over the entire surface of the color filter layer 86 and the black matrix 88. A pixel electrode 92 is formed on the insulating layer and is connected to the thin film transistor T.

As shown in FIG. 3B, the black matrix 88 is thickly formed to minimize parasitic capacitance in the COT structure. Therefore, when the rubbing direction rl is from a right upper portion to a left lower portion at a 45 degree angle from one corner of the pixel electrode, as shown in FIG. 3A, and from right to left, as shown in FIG. 3B, light leakage caused by a rubbing defect in region RD can occur.

SUMMARY OF THE INVENTION

Accordingly, the present invention is directed to an LCD device and a method of fabricating the LCD device that substantially obviates one or more of the problems due to limitations and disadvantages of the related art.

An object of the present invention is to provide an LCD device having an improved aperture ratio.

Another object of the present invention is to provide an LCD device having an image quality by preventing a rubbing defect that causes light leakage.

Another object of the present invention is to provide a method of fabricating the LCD device to prevent a rubbing defect that causes light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate and a second substrate facing the first substrate, the first and second substrate including a pixel region; a first alignment layer over the first substrate; a black matrix on the second substrate, the black matrix includes a first sloped side and a second sloped sides that is gentler than the first sloped side; a color filter layer on the black matrix; a second alignment layer over the color filter layer, the first and second alignment layers aligned along predetermined rubbing directions, respectively; a liquid crystal layer interposed between the first and second alignment layers, wherein the rubbing direction of the second alignment layer corresponds to a first direction from the second sloped side to the first sloped side.

In another aspect, a liquid crystal display device includes: a gate line on a first substrate; a data line crossing the gate line; a thin film transistor adjacent to a crossing of the gate line and the data line; a pixel electrode connected to the thin film transistor; a black matrix on the first substrate; a first sloped side of the black matrix that is less steep than a second sloped side of the black matrix; a first alignment layer over the pixel electrode; a second substrate facing the first substrate; a second alignment layer over the second substrate; and a rubbing direction of the second alignment layer corresponding to a first direction from the first sloped side to the second sloped side.

Yet, in another aspect, a method of fabricating a substrate for a liquid crystal display device includes: forming a black matrix material layer on a substrate; exposing the black matrix material layer through a mask, the mask including a transmissive portion, a shielding portion and a slit portion between the transmissive portion and the shielding portion; patterning the black matrix material layer into a black matrix, the black matrix having a first sloped side that is less steep than a second sloped side; and forming an alignment layer having a rubbing direction, wherein the first sloped side is formed by aligning with the slit portion in the step of exposing, the rubbing direction corresponds to a first direction from the first sloped side to the second sloped side.

Still, in another aspect, a method of fabricating a substrate for a liquid crystal display device includes: forming a black matrix material layer on a substrate; exposing the black matrix material layer through a mask, the mask includes a transmissive portion, a shielding portion and a half transmissive portion between the transmissive portion and the shielding portion; patterning the black matrix material layer into a black matrix, the black matrix having a first sloped side that is less steep than a second sloped side; and forming an alignment layer having a rubbing direction, wherein the first sloped side is formed by aligning with the slit portion in the step of exposing, the rubbing direction corresponds to a first direction from the first sloped side to the second sloped side It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a perspective view of an LCD device according to the related art.

FIG. 3A is a plan view and FIG. 3B is a cross sectional view taken along a line III—III of FIG. 3A.

FIG. 4A is a plan view and FIG. 4B is a cross-sectional view taken along a line IV—IV of FIG. 4A.

FIG. 6A is a plan view, FIG. 6B is a cross sectional view taken along a line VI—VI of FIG. 6A.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or the like parts.

Figure 2A:
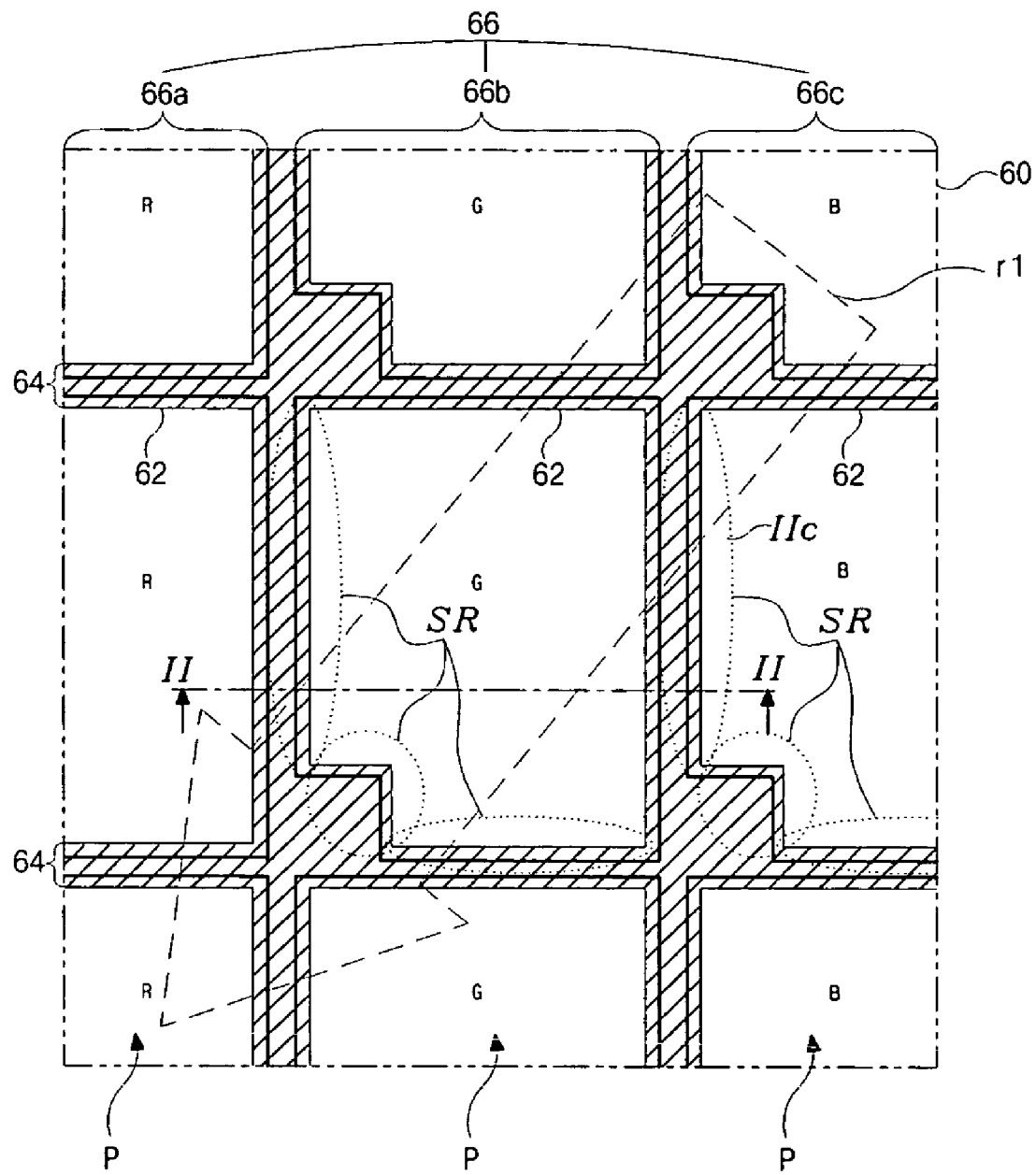
FIGS. 2A and 2B are schematic views showing a liquid crystal display device according to the related art.
Figure 2B:
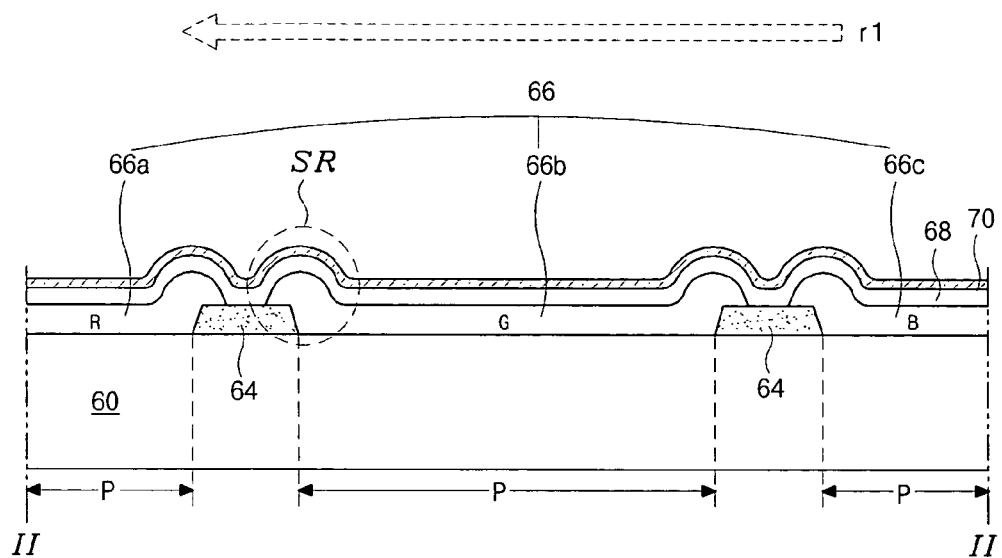
Figure 3A:
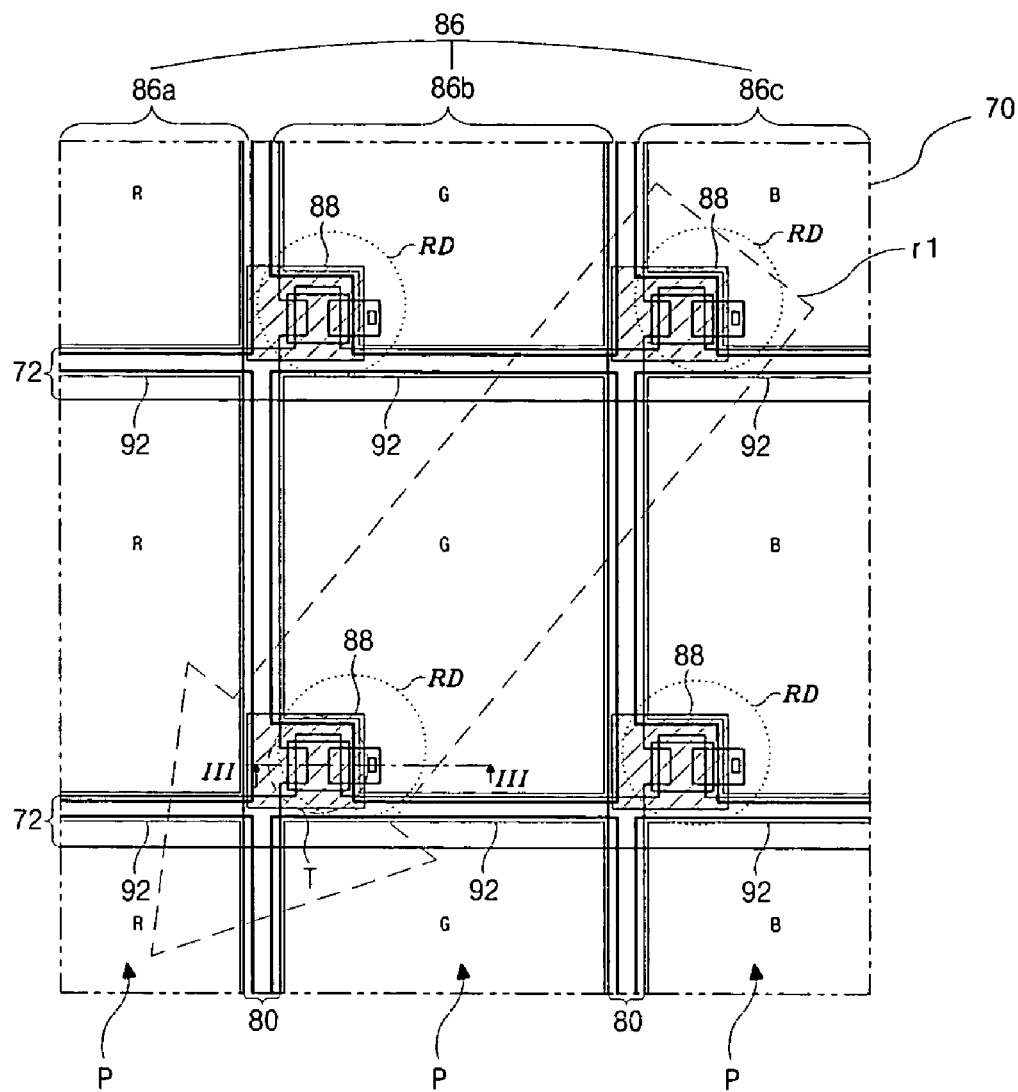
FIGS. 3A and 3B are schematic views showing a COT type LCD device according to the related art.
Figure 3B:
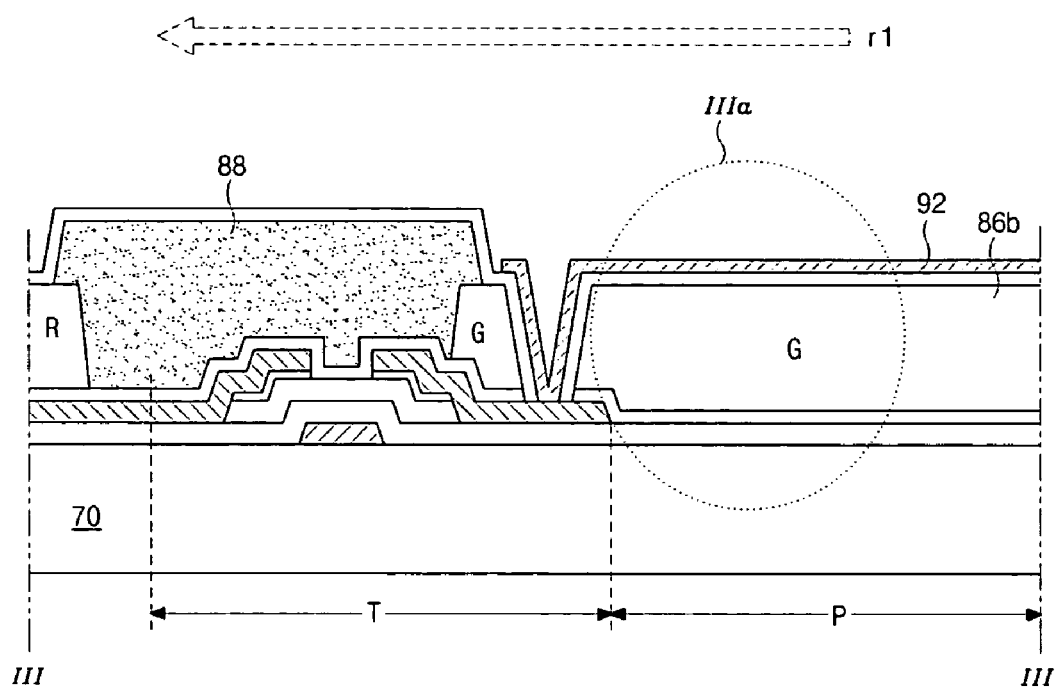
Figure 4A:
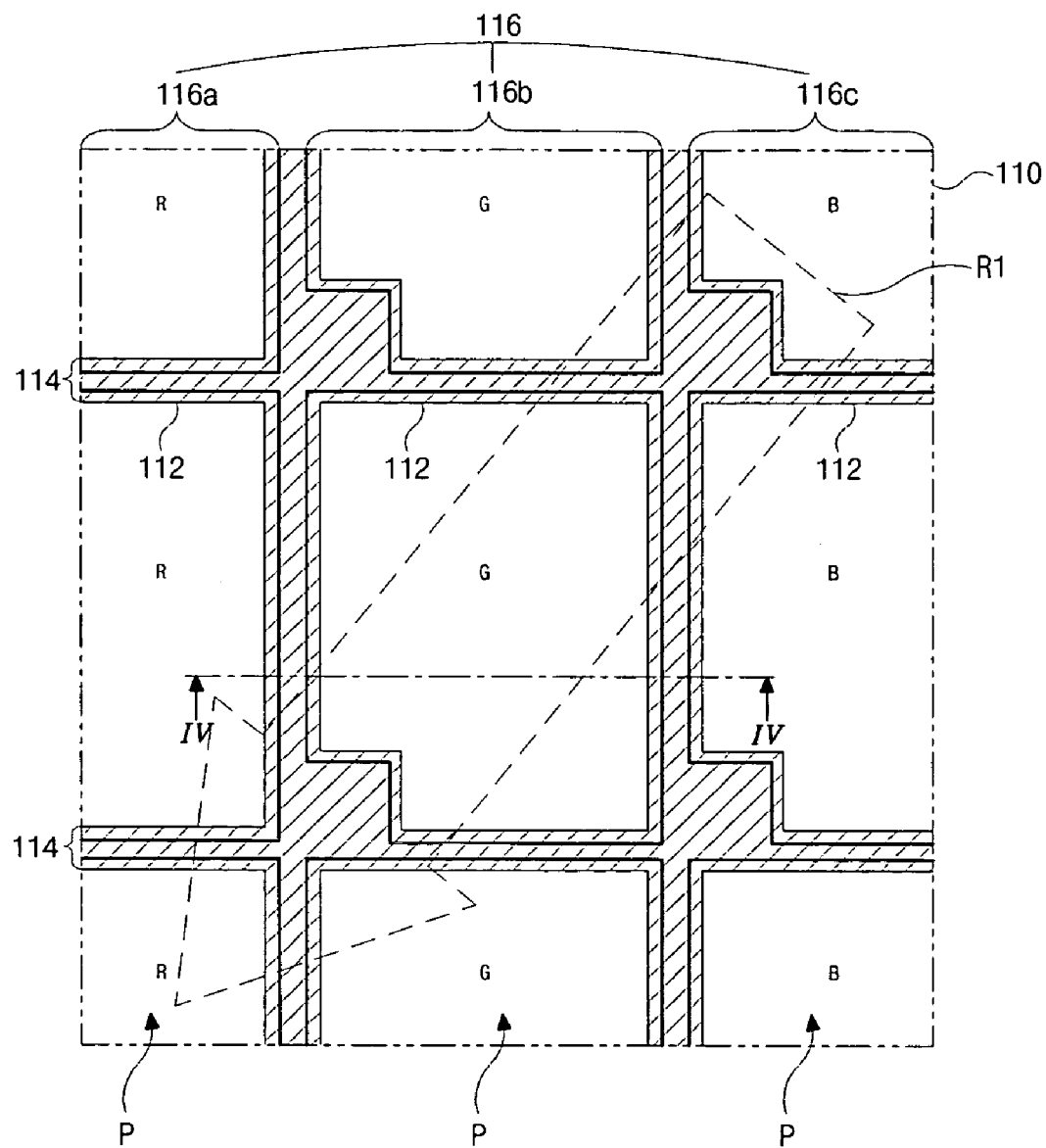
FIGS. 4A and 4B are schematic views showing a liquid crystal display device according to an embodiment of the present invention.
Figure 4B:
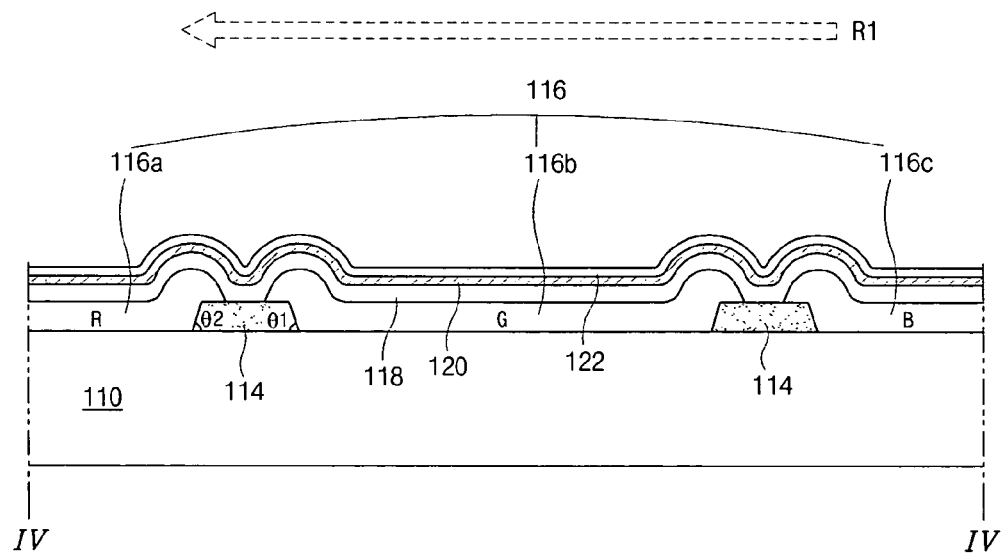

FIGS. 4A and 4B are schematic views showing a liquid crystal display device according to an embodiment of the present invention. FIG. 4A is a plan view and FIG. 4B is a cross-sectional view taken along a line IV—IV of FIG. 4A.

As shown in FIG. 4A, a plurality of pixel regions P are defined on a substrate 110. A black matrix 114 is formed on the substrate 110 and has a plurality of open portions 112. Each of the open portions 112 corresponds to each of the pixel regions P. The black matrix 114 is formed from resin materials including at least one of carbon particles, titanium oxide (TiOx) and color pigments.

A color filter layer 116 is formed over the black matrix 114 on the substrate 110 and includes red, green and blue sub-color filters 116a, 116b and 116c. Each of red, green and blue sub-color filters 116a, 116b and 116c is located in one of the open portions 112. An overcoat layer 118, a common electrode 120 and an alignment layer 122 are sequentially formed over the black matrix 114 and the color filter layer 116 on the substrate 110.

A direction from the right sloped side to the left sloped side corresponds to the rubbing direction R1. Although not shown, when a rubbing direction of the substrate 110 is from a right upper portion to a left lower portion at a 45 degree angle, as shown in FIG. 4A, the right sloped side of the black matrix 114 is less steep than a left sloped side of the black matrix 114.

As shown in FIG. 4B, the black matrix 114 includes a first sloped side having a first internal acute angle θ1 with respect to the substrate 110, and a second sloped side having second internal acute angle θ2 with respect to the substrate 110. When the rubbing direction R1 corresponds to a direction from the first internal acute angle θ1 to the second internal acute angle θ2, the first internal acute angle θ1 is less than the second internal acute angle θ2. For example, when the rubbing direction R1 is from right to left, the right internal acute angle is less than the left internal acute angle. In another example, when the rubbing direction from left to right, the left internal acute angle is less than the right internal acute angle.

The color filter layer 116 is formed over the black matrix 114 on the substrate 110. The red, green and blue sub-color filter layers 116a, 116b and 116c are located in the open potions 112. The color filter layer 116 has a step difference with respect to the black matrix 114 at portion of the color filter layer 116 that overlaps the black matrix 114. Such a difference can be more than about 5,000 angstrom. In addition, an overcoat layer 118, a common electrode 120 and an alignment layer 122 are sequentially formed over the black matrix 114 and the color filter layer 116 on the substrate 110.

As explained above, according to an embodiment of the present invention, the internal angles of sloped sides of the black matrix 114 are decreased depending on the rubbing direction R1 to increase surface flatness of the overcoat layer 118 in comparison the related art, thereby improving permeability by reducing the thickness of the overcoat layer 118. Further, image quality problems, such as light leakage caused by a rubbing defect in the pixel region P can be prevented.

Figure 5A:
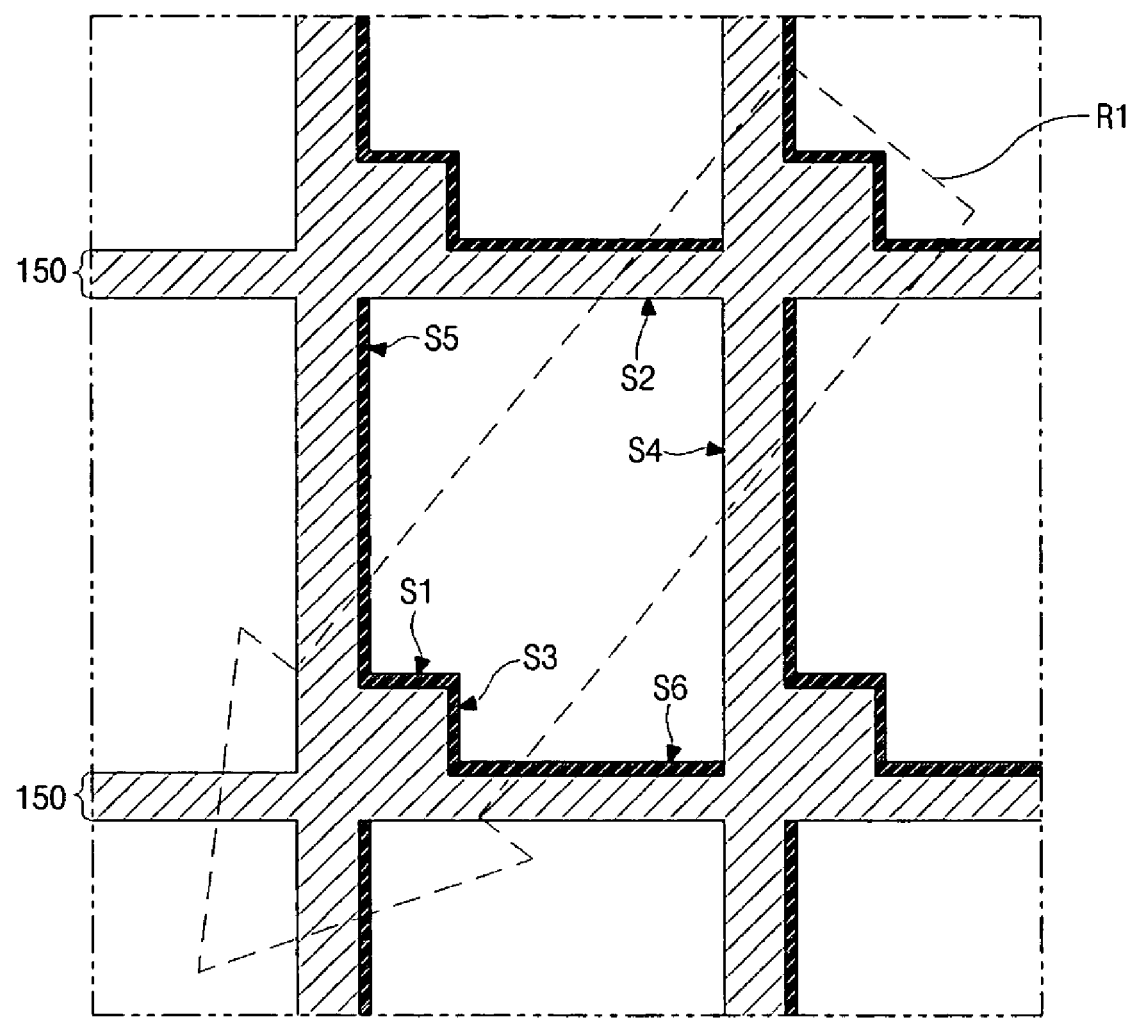
FIGS. 5A to 5C are schematic views showing a black matrix pattern structure according to an embodiment of the present invention.
Figure 5B:
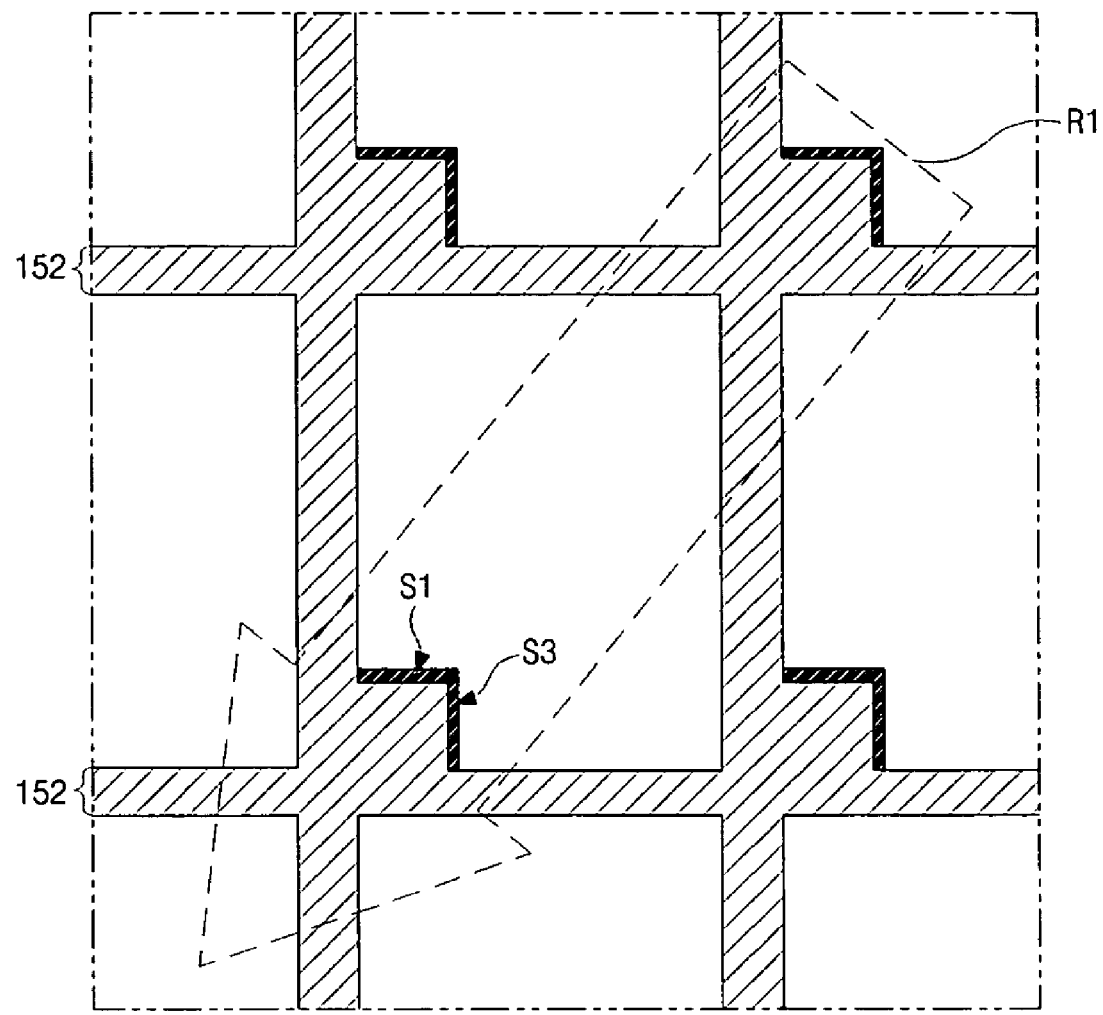
Figure 5C:
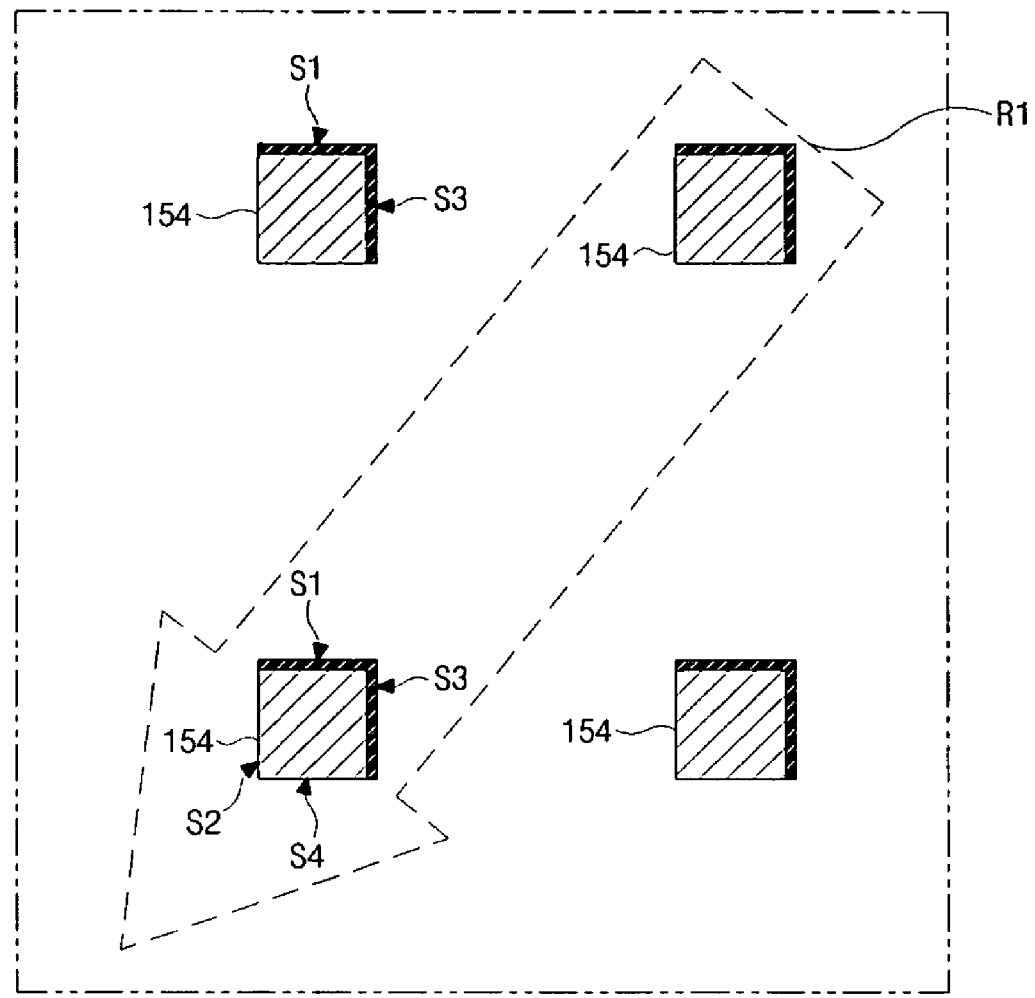

FIGS. 5A to 5C are schematic views showing a black matrix pattern structures according to an embodiment of the present invention. As shown in FIG. 5A, a black matrix 150 has first to sixth sloped sides S1 to S6. When the rubbing direction R1 is from a right upper portion to a left lower portion at a 45 degree angle from one corner of the pixel electrode, the first, third, fifth and sixth sloped sides S1, S3, S5 and S6 are less steep than the second and fourth sloped sides S2 and S4. For example, a direction from the second and fourth sloped sides S2 and S4 to the first, third, fifth and sixth sloped sides S1, S3, S5 and S6 corresponds to the rubbing direction R1. In an alternative, as shown in FIG. 5B, the first and third sloped sides S1 and S3 surrounding a thin film transistor of an array substrate (not shown) are less steep than the other sloped sides, such as the second, fourth, fifth and sixth sloped sides S2, S4, S5 and S6 shown in FIG. 5A.

FIG. 5C shows yet another alternative in which a black matrix 154 has a square shape covering a thin film transistor.

The square-shaped matrix 154 that includes first to fourth sloped sides S1 to S4. More particularly, the first sloped side is located near the third sloped side and the second sloped side is located near the fourth sloped side. A direction from the first and third sloped sides S1 and S3 to the second and fourth sloped sides S2 and S4 corresponds to the rubbing direction R1. As a result, when the rubbing direction R1 is from right to left, right sloped sides such as the first and third sloped sides S1 and S3 should be less steep than left sloped sides, such as the second and fourth sloped sides S2 and S4.

Figure 6A:
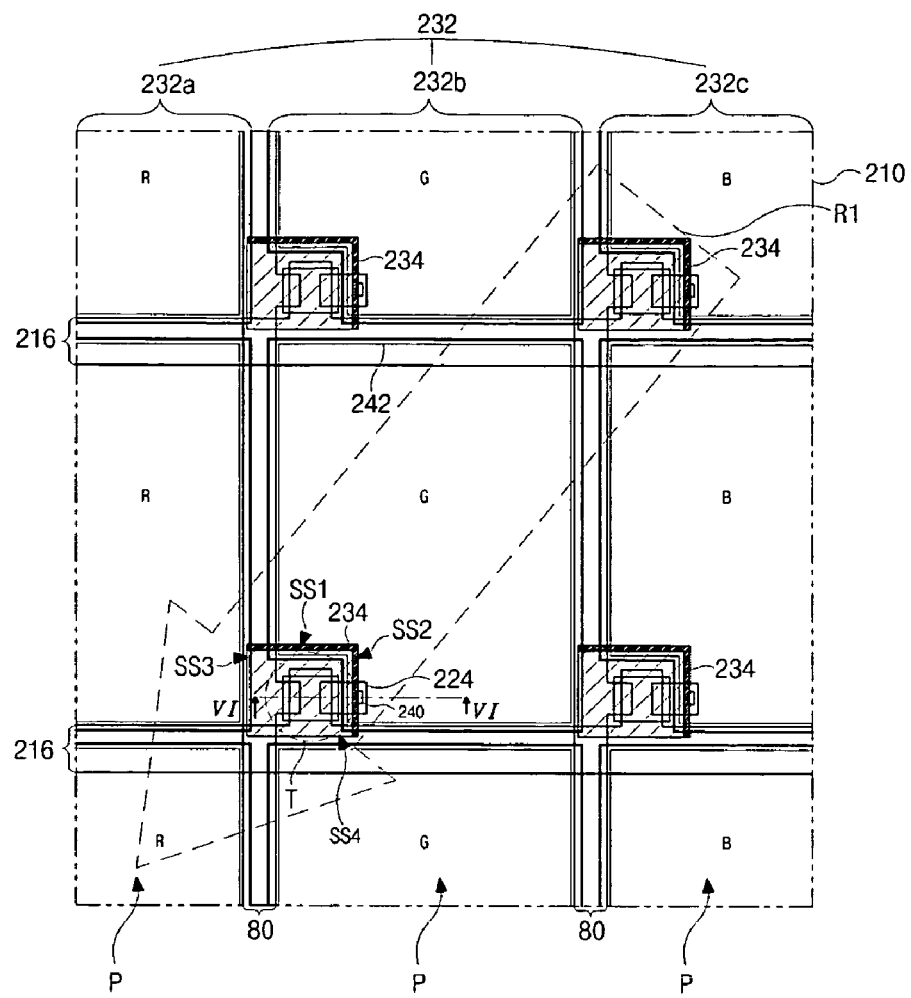
FIGS. 6A and 6B are schematic views showing a COT type LCD device according to an embodiment of the present invention.
Figure 6B:
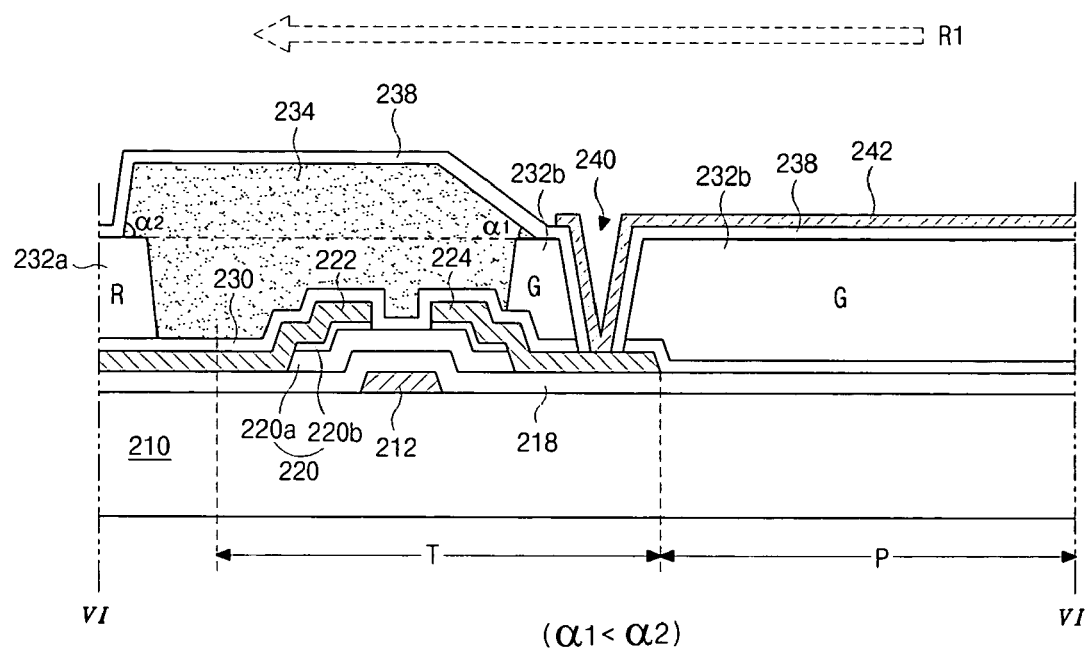

FIGS. 6A and 6B are schematic views showing a COT type LCD device according to an embodiment of the present invention. FIG. 6A is a plan view, FIG. 6B is a cross sectional view taken along a line VI—VI of FIG. 6A. As shown in FIG. 6A, a gate line 216 is formed on a substrate 210 along a first direction, a data line 226 is formed along a second direction orthogonal to the first direction. A thin film transistor T is located adjacent to a crossing of the gate line 216 and the data line 226.

As shown in FIG. 6A, a color filter layer 232 that includes red, green and blue sub-color filters 232a, 232b and 232c is formed over the gate line 216, the data line 226 and the thin film transistor T on the substrate 210. Each of the red, green and blue sub-color filters 232a, 232b and 232c is located in one of the pixel regions P that are defined by the gate line 216 and the data line 226. Moreover, a black matrix 234, a square pattern, is formed on the color filter layer 232 over the thin film transistor T. A pixel electrode 242 is formed on the black matrix 234 and is connected to the thin film transistor T.

In FIG. 6B, a gate electrode 212 is formed on a substrate 210, a gate insulating layer 218 is formed over an entire surface of the substrate 210 having the gate electrode 212. A semiconductor layer 220 is formed on the gate insulating layer 218 over the gate electrode 212. The semiconductor layer 220 includes an active layer 220a of intrinsic amorphous silicon and an ohmic contact layer 220b of impurity doped amorphous silicon. In addition, a source electrode 222, a drain electrode 224 that is spaced apart from the source electrode 222, and a data line 226 that is connected to the source electrode 222. The gate electrode 212, the semiconductor layer 220, the source electrode and the drain electrode 222 and 224 constitute a thin film transistor T.

An interlayer 230 is formed over an entire surface of the substrate 210 having the thin film transistor T. A color filter layer 232 is formed on the black matrix 234 over the thin film transistor T. More specifically, the color filter layer 232 includes red, green and blue sub-color filters 232a, 232b and 232c that are arranged in a repeating order. Red, green and blue sub-color filters 232a, 232b and 232c are located in the pixel regions P and overlap portions of the gate and data lines 216 and 226. Therefore, a portion of the black matrix 234 overlapping the gate and the data lines 216 and 226 may be omitted, as shown in FIG. 6A.

Next, a passivation layer 238 is formed on an entire surface of the black matrix 234 and the color filter layer 232. A drain contact hole 240 in the gate insulating layer 218, the interlayer 230, the color filter layer 232 and the passivation layer 238 exposes a portion of the drain electrode 226. In other words, the gate insulating layer 218, the color filter layer 232 and the passivation layer 238 define the drain contact hole 240. A pixel electrode 240 is formed on the passivation layer 238 and is connected to the drain electrode 224 via the drain contact hole 240.

As shown, when a rubbing direction R1 is from right to left, a first internal acute angle α1 or right angle made by the second sloped side SS2 with respect to the substrate is less steep than a second acute angle α2 or left angle made by the third sloped side SS3 with respect to the substrate in the same horizontal plane. For example, the value of the second internal acute angle α2 is within a range of 60 to 80 degrees.

When a rubbing direction R1 is from a right upper portion to a left lower portion at a 45 degree angle from a pixel electrode, the R1 direction is from first and second sloped sides SS1 and SS2 of the black matrix 234 to third and fourth sloped sides SS3 and SS4 of the black matrix 234. Because the third and fourth sloped sides SS3 and SS4 of the black matrix 234 are adjacent to a non-display region surrounding the pixel region P, a rubbing defect can be caused by the slope of the third and fourth sloped sides SS3 and SS4 of the black matrix 234 does not cause light leakage that would affect image quality. In addition, if the third and fourth sloped sides SS3 and SS4 are as steep as the first and second sloped sides SS1 and SS2, the rubbing non-uniformity range of the third and fourth sloped sides SS3 and SS4 becomes bigger. Therefore, a less steep third and fourth sloped sides SS3 and SS4 with respect to the first and second sloped sides SS1 and SS2 will adversely affect image quality of the pixel regions.

As a result, the black matrix 234 having the square shape as the thin film transistor shielding means according to an embodiment of the present invention can improve an aperture ratio by relatively lowering sloped sides depending on the rubbing direction and can block light leakage phenomenon. However, the black matrix 234 according to an embodiment of the present invention is not limited to a square structure but can be formed as polygon or circular structures in some cases.

The black matrix is thicker than the insulating layer according to the related art in order to minimize parasitic capacitance using black matrix materials, such as carbon particles having conductive characteristics, so a rate of rubbing defect caused by increasing the thickness become higher. Therefore, by controlling the angle of the black matrix depending on rubbing direction, light leakage phenomenon caused by the rubbing defect can be prevented.

Figure 7:
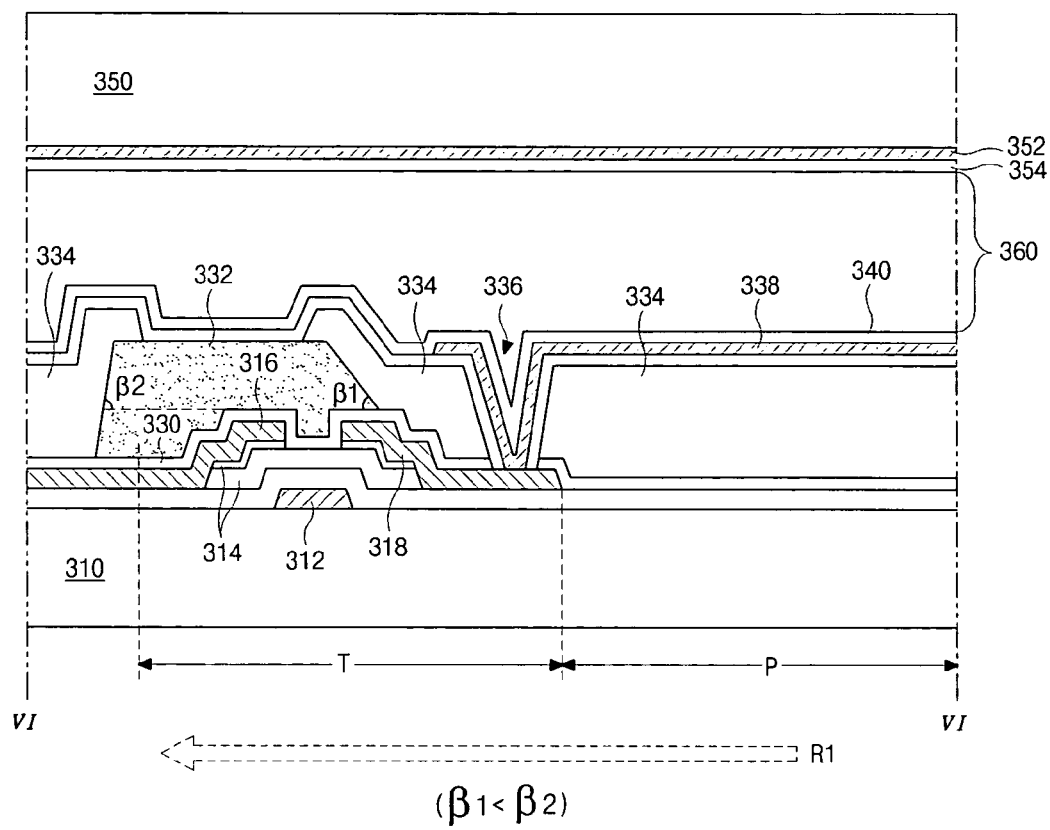
FIGS. 7 to 9 are schematic cross sectional views taken along a line VI—VI of FIG. 6A showing a COT type LCD device according to an embodiment of the present invention.
Figure 8:
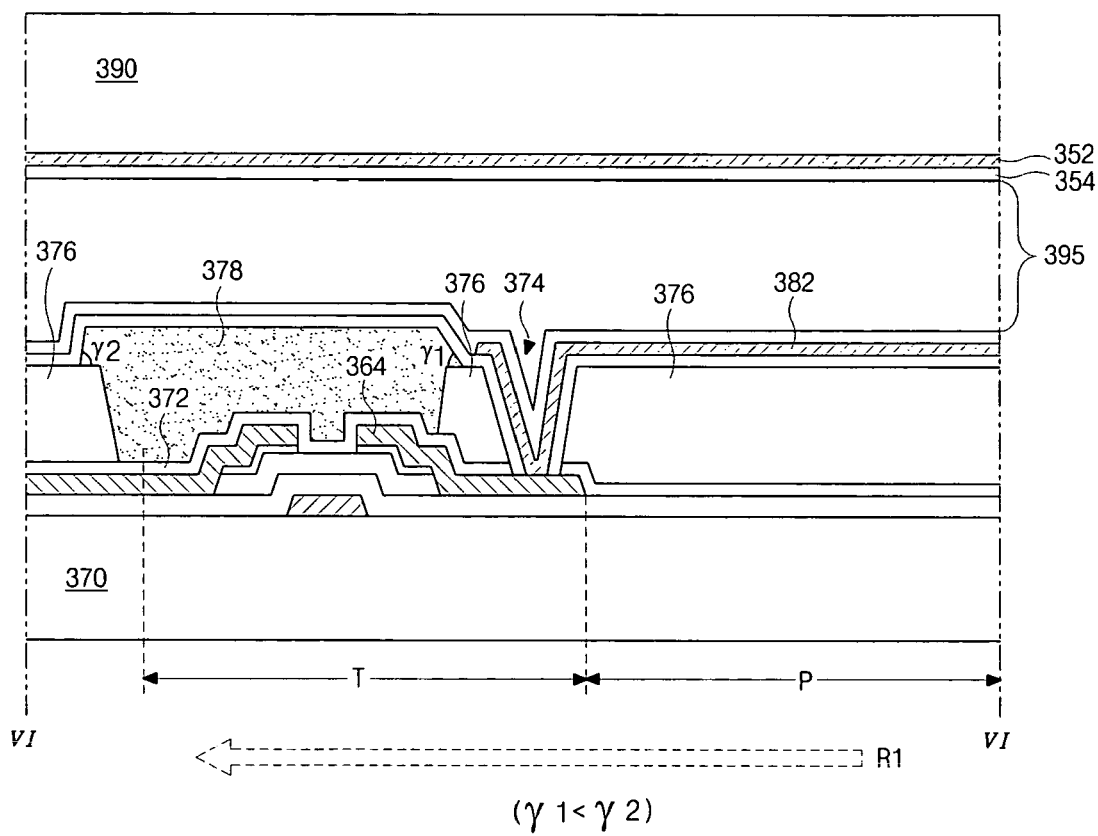
Figure 9:
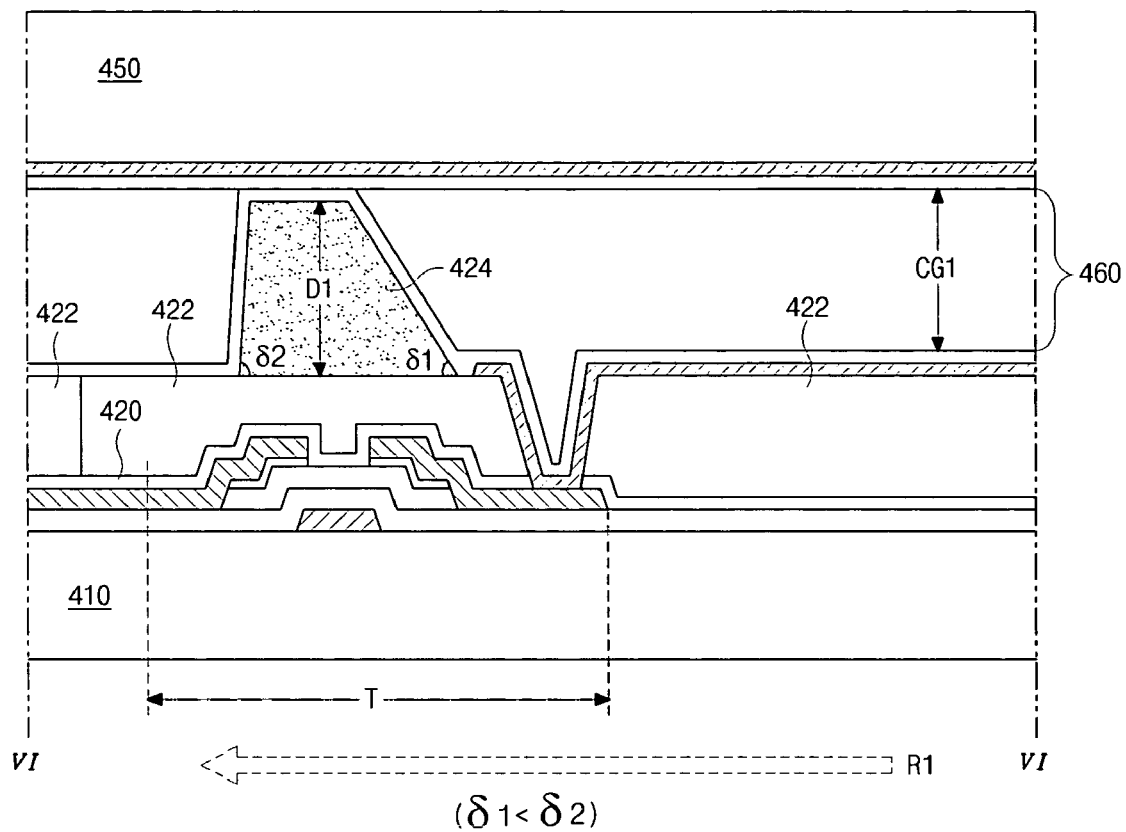

FIGS. 7 to 9 are schematic cross sectional views taken along a line VI—VI of FIG. 6A showing a COT type LCD device according to an embodiment of the present invention.

As shown in FIG. 7, a passivation layer 330 is formed on a first substrate 310 having a thin film transistor T and it directly covers the thin film transistor T, a black matrix 332 is formed on the passivation layer 330 over the thin film transistor T, and a color filter layer 334 is formed within the black matrix 332 in the pixel region P shown in FIG. 6B. The color filter layer 334 overlaps edges of the black matrix 332. The thin film transistor T includes the gate electrode 312, the semiconductor layer 314, the source electrode 316 and the drain electrode 318. The color filter layer 334 and the passivation layer 330 have a drain contact hole 336 that exposes the portion of the drain electrode 318. A pixel electrode 338 is formed on the passivation layer 330 and is connected to the drain electrode 318 via the drain contact hole 336, a first alignment layer 340 having a predetermined rubbing direction is formed on an entire surface of the pixel electrode 338.

A second substrate 350 faces the first substrate 310. A common electrode 352 and a second alignment layer 354 are sequentially formed in an inner surface of the second substrate 350. A liquid crystal material 360 is interposed between the first and second alignment layers 340 and 354. As shown in FIG. 7, when a rubbing direction RI is from right to left, a first internal acute angle β1 of the second sloped side SS2 of the black matrix 332 is less than a second internal acute angle β2 of the third sloped SS3 side in the same horizontal plane.

In FIG. 8, a characteristic structure distinguished from FIG. 7 will be explained. A passivation layer 372 is formed on a first substrate 370 having a thin film transistor T and it directly covers the thin film transistor T, a black matrix 378 is formed on the passivation layer 372 over the thin film transistor T, and a color filter layer 376 is formed within the black matrix 378. A color filter layer 376 is formed on a first substrate 370 having a thin film transistor T and a passivation layer 372 shares a drain contact hole 374 with the passivation layer 372. A pixel electrode 382 is formed on the passivation layer 372 and is connected to the drain electrode 364 via the drain contact hole 374.

When a rubbing direction R1 is from right to left, a first internal acute angle γ1 of the second sloped side SS2 of the black matrix 378 has is less than a second internal acute angle γ2 of the third sloped side SS3 in the same horizontal plane. A second substrate 390 faces the first substrate 370, a liquid crystal material 395 is interposed between the first and second substrates 370 and 390.

In FIG. 9, a black matrix 424 that can be use as both a spacer and a black matrix. The black matrix 424 has a thickness corresponding to a cell gap CG1 that defines the thickness of the liquid crystal material 460. The black matrix 424 is positioned on the color filter layer 422 over the thin film transistor T. When a rubbing direction R1 is from right to left, a first internal acute angle δ1 of the second sloped side SS2 of the black matrix 424 is less than a second internal acute angle δ2 of the third sloped side SS3 in the same horizontal plane. Because the black matrix 424 also acts as a spacer, its thickness is larger than the black matrix according to the related art. As a result, by decreasing the steepness of the sloped sides of the black matrix 424 depending on the rubbing direction R1, light leakage in the pixel region P can be effectively minimized.

Figure 10A:
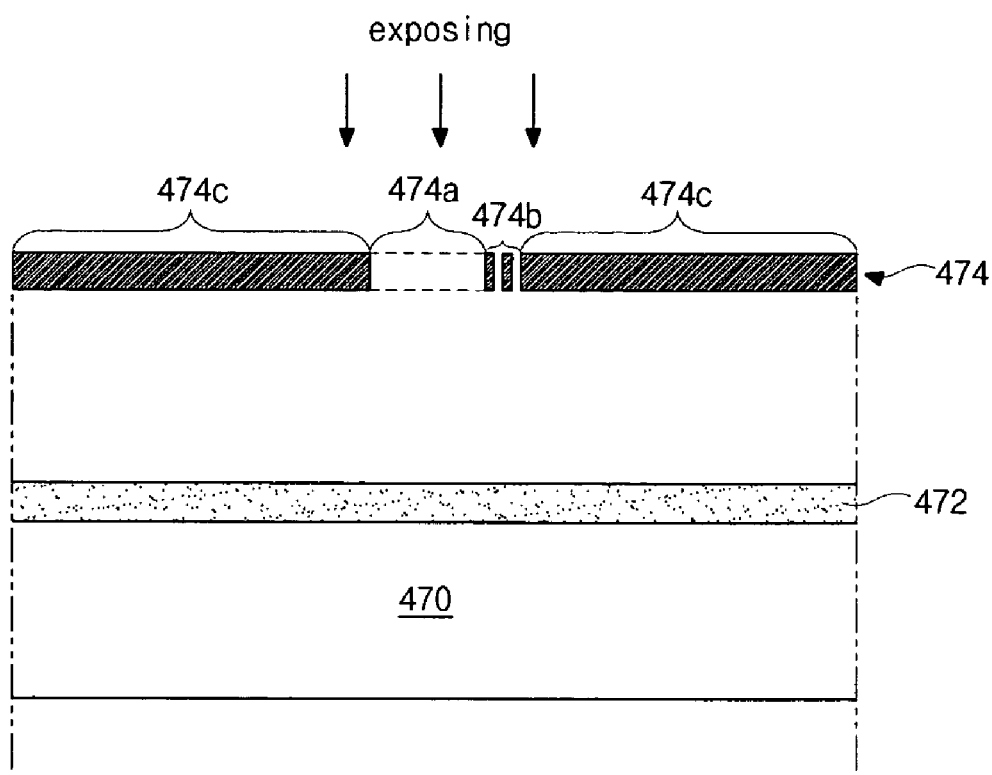
FIGS. 10A to 10C are schematic cross sectional view of the manufacturing process of a black matrix pattern having different sloped sides from each other according to an embodiment of the present invention.
Figure 10B:
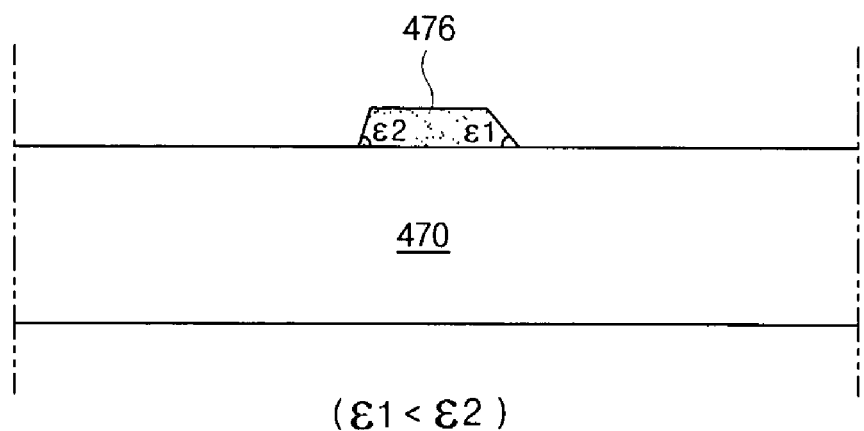
Figure 10C:
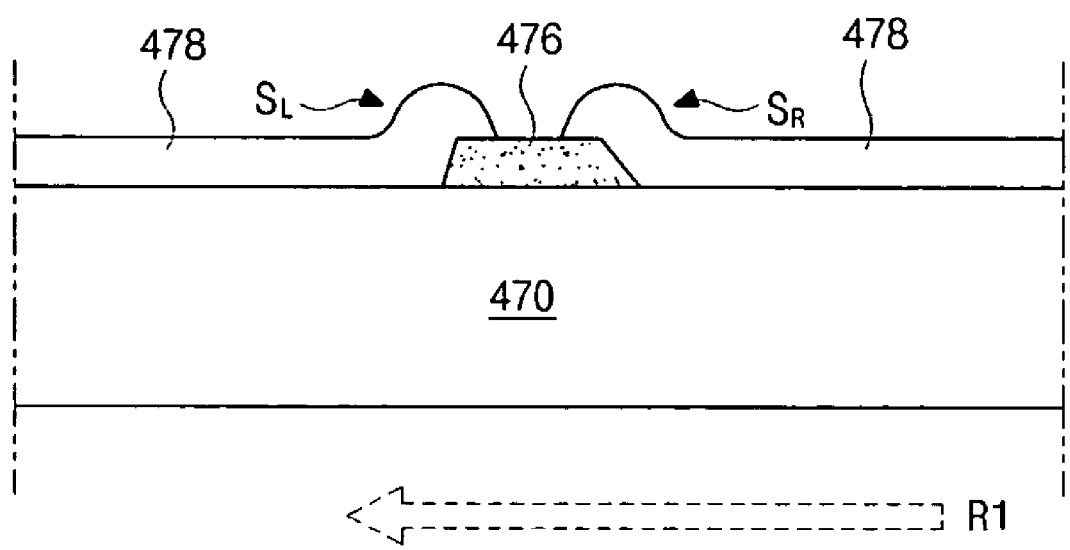

FIGS. 10A to 10C are schematic cross sectional view of the manufacturing process of a black matrix pattern having sloped sides at different angles according to an embodiment of the present invention. As shown in FIG. 10A, a black matrix material layer 472 is formed on a substrate 470. Then, the black matrix material layer 472 is patterned using a mask 474. The black matrix material layer 472 is selected from resin including at least one of carbon particles, titanium oxide (TiOx) and color pigments. Specifically, by selecting photosensitive resin as black matrix materials, the step of patterning can be performed without using other photosensitive materials. For example, the photosensitive resin is a negative type material and the portion of the photosensitive resin exposed with a mask will remain.

A slit portion 474b of the mask 474 is positioned between the transmissive portion 474a and the shielding portion 474c. The mask 474 includes a transmissive portion 474a corresponding to a portion of a black matrix that will later be formed. A slit portion 474b positioned on the right of the transmissive portion 474a.

The exposure dose of light that transmits through the slit portion 474b is less than the exposure dose of light that transmits the transmissive portion 474a. Although not shown, a half-tone mask that controls irradiating does of light by using half transparent material portion may be utilized instead of the slit portion 474b.

In FIG. 10B, it shows patterning the black matrix material layer 472 as shown in FIG. 10A into a black matrix 476. When a rubbing direction is from right to left, a right sloped side of the black matrix 476 is less steep than a left sloped side of the black matrix 476. Therefore, a first internal acute angle $\epsilon 1$ of the right sloped side is less than a second internal acute angle $\epsilon 2$ of the left sloped side.

In FIG. 10C, a color filter layer 478 is formed on the substrate 470 having the black matrix 476. Actually, the color filter layer 478 is divided into pixel regions as shown in FIG. 6A and overlaps edges of the black matrix 476 in the non-pixel regions. For example, the right sloped side $S_R$ of the black matrix 476 is less steep than the left sloped side $S_L$ because of the rubbing direction R1 from right to left. In other words, a first overlapped side between the right portion of the black matrix 476 and the color filter layer 478 is less steep than a second overlapped side between the left portion of the black matrix 476 and the color filter layer 478. By decreasing the steepness of the first overlapped side that may be more severely rubbed than the second overlapped portion, rubbing defects in the LCD device can be effectively reduced. Specifically, a small portion of angle corresponds to the near portion at the pixel region.

According to the LCD device having the exemplary black matrix pattern structure of the present invention, by forming the black matrix having sides with different steepnesses such that a first internal acute angle is less than a second internal acute angle when the rubbing direction is in a direction from the first internal acute angle to the second internal acute angle. Therefore, rubbing defects can be lowed. In addition, light leakage in the pixel region caused by the rubbing defect is prevented, thereby improving an aperture ratio and image quality.

In general, a black matrix structure is used in a LCD device such that a color filter is formed over the black matrix. Image deterioration caused by non-uniformity of cell gap in the step portion of the color filter overlapping black matrix can be prevented. Moreover, in the case of the lack matrix and the color filter layer are formed in an array substrate such as COT (color filter layer on thin film transistor) or TOC (thin film transistor on color filter layer), step difference between the black matrix and the color filter layer can be lowered due to minimization of the formation thickness of an overcoat layer that is located between the black matrix and the color filter layer. Therefore, a transparent ratio can become higher.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
    a first substrate and a second substrate facing each other, the first and second substrate including pixel regions;
    a first alignment layer on the first substrate;
    a black matrix on the second substrate;
    a first sloped side of the black matrix that is less steep than a second sloped side of the black matrix;
    a color filter layer on the black matrix;
    a second alignment layer on the color filter layer;
    a liquid crystal material interposed between the first and second alignment layers; and,
    a rubbing direction of the second alignment layer corresponding to a first direction from the first sloped side to the second sloped side.

2. The device according to claim 1, wherein the color filter layer has a step difference of more than about 5,000 angstroms with respect to the black matrix at portion of the color filter layer that overlaps the black matrix.

3. The device according to claim 1, wherein the color filter layer includes red, green and blue sub-color filters located in the pixel regions.

4. The device according to claim 1, wherein the black matrix has an open portion corresponding to each of the pixel regions.

5. The device according to claim 4, wherein the color filter layer overlaps edges of the black matrix.

6. The device according to claim 1, further comprising a gate line on the first substrate, a data line crossing the gate line, a thin film transistor adjacent to a crossing of the gate line and the data line, and a pixel electrode connected to the thin film transistor.

7. The device according to claim 6, wherein the black matrix has an island shape over the thin film transistor.

8. The device according to claim 6, wherein the black matrix includes a third sloped side and a fourth sloped side such that the first and third sloped sides from a first internal acute angle with respect to the second substrate that is less than a second internal acute angle that the second and fourth sloped sides make with respect to the second substrate.

9. The device according to claim 8, wherein the first sloped side is adjacent to the second and third sloped sides.

10. The device according to claim 6, wherein the black matrix covers the thin film transistor.

11. The device according to claim 10, wherein the value of the second internal acute angle is within a range of 60 to 80 degrees.

12. The device according to claim 1, wherein the black matrix includes a light shielding material.

13. The device according to claim 1, wherein the black matrix includes a resin material.

14. The device according to claim 1, wherein the resin material includes one of carbon particles, titanium oxide (TiOx) and color pigments.

* * * * *